L. B. OLMSTED.

9329X

Domestic Oven.

Patented Jan. 20, 1836.

THE NORRIS PETERS CO., PHOTO-LITHO., WASHINGTON, D. C.

Lorenzo B. Olmsted of Binghamton, New York

Letters Patent

The schedule referred to in these Letters Patent and making part of the same, containing a description in the words of the said Lorenzo B. Olmsted himself of his improvement in the portable Reflecting Baker.

To all to whom these presents shall come.

Figure 3:
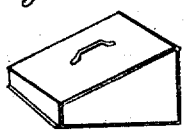
Figure 1:
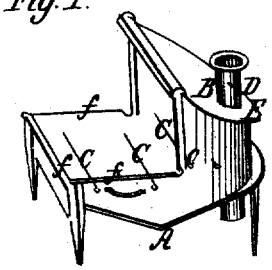
Figure 2:
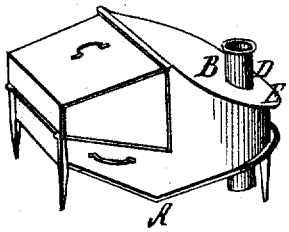

Be it known that I, Lorenzo B. Olmsted of Binghamton in the County of Broome and State of New York, have in vented a new and useful Portable Reflecting Baker, and that the following is a full and exact description of the construction and operation of the said invention. Fig 1 is the annexed draft is a representation of the Baker with the reflector off. the Baker is made of tin, but may be of any other suitable metal. The bottom is made about one eighth longer than its width and from A is bent at an angle of about 140 degrees rising forward to the front and [illegible] rear to the back of the baker which is a semicircle, — The top B. corresponds in shape to that part of the bottom immediately under it & rises from the back at an angle of about 30 degrees to its termination on the top. the ends are similar in appearance to the drawing and perforated with holes for receiving the rods C. C. which [illegible] support the baking plates D is a sheet iron cylinder (having a [illegible] perforated plate at the bottom and [illegible] [illegible] the top) to contain coals. this cylinder [illegible] [illegible] the [illegible] [illegible] bottom of the Baker and is kept from [illegible] [illegible] [illegible] [illegible] [illegible] E at E. — [illegible] [illegible] [illegible] [illegible] [illegible] and front of about 3 [illegible] [illegible] [illegible] [illegible] plate is bent down at [illegible] [illegible] [illegible] [illegible] [illegible] reflector. Fig 2 is the [illegible] [illegible] [illegible] [illegible] [illegible] is the movable reflector

4329X

What I claim as new is first the peculiar shape of the Baker, being the best calculated to concentrate the heat radiating from the cylinder upon the matter to be baked, 2nd the moveable reflector and 3d. the construction and position of the cylinder, The operation is performed by placing the matter to be baked on plates and placing the latter on the floor in the reflector adjusted as in fig. 2 and live coals placed in the cylinder the operation is then performed sooner than in any known oven or Baker, with an immense saving of fuel!

Witnesses
George Park,
Geo. Newell

Lorenzo B. Olmstead

468 [illegible]

Drawing